(12) United States Patent
Devin et al.

(10) Patent No.: US 6,398,286 B1
(45) Date of Patent: Jun. 4, 2002

(54) REINFORCED AND LIGHTWEIGHT MOTOR-VEHICLE BONNETT

(75) Inventors: Jean-Marc Devin, Paris; Francis Schmit, Ansacq; Olivier Brun, La Courneuve; Pascal Deprez, Metz, all of (FR)

(73) Assignee: Usinor, Puteaux (FR)

( * ) Notice: Subject to any disclaimer, the term of this patent is extended or adjusted under 35 U.S.C. 154(b) by 0 days.

(21) Appl. No.: 09/658,492

(22) Filed: Sep. 8, 2000

(30) Foreign Application Priority Data

Sep. 9, 1999 (FR) .............................. 99 11260

(51) Int. Cl.$^7$ .............................. B62D 25/10
(52) U.S. Cl. ...................... 296/76; 180/69.2
(58) Field of Search ................. 296/188, 191, 296/76; 180/69.2, 69.21

(56) References Cited

U.S. PATENT DOCUMENTS

| | | | | |
|---|---|---|---|---|
| 2,709,108 A | * | 5/1955 | Eggert, Jr. .................... | 296/76 |
| 4,865,789 A | * | 9/1989 | Castro et al. ............... | 264/120 |
| 5,115,878 A | * | 5/1992 | Hayata .................... | 180/69.21 |
| 5,535,841 A | * | 7/1996 | Cobes, Jr. et al. ......... | 180/69.2 |
| 5,806,619 A | * | 9/1998 | Kleinhoffer et al. ....... | 180/69.2 |
| 5,833,024 A | * | 11/1998 | Kaneko ...................... | 180/69.2 |
| 6,227,606 B1 | * | 5/2001 | Schroeder et al. ...... | 296/191 X |

FOREIGN PATENT DOCUMENTS

| | | |
|---|---|---|
| EP | 0 598 428 | 5/1994 |
| FR | 2 621 677 | 4/1989 |
| FR | 2 726 802 | 5/1996 |

* cited by examiner

Primary Examiner—Joseph D. Pape
Assistant Examiner—Jason Morrow
(74) Attorney, Agent, or Firm—Young & Thompson

(57) ABSTRACT

Motor-vehicle bonnet having a torsional strength greater than or equal to 5 N/mm and a flexural strength greater than 55 N/mm, comprising:

an external shell (1; 1'; 1") made of laminated composite sheet comprising two external facings made of steel sheet and a core of uniform thickness made of polymer material;

internal reinforcing means (2; 3, 3'; 8) fastened to the said shell, the weight of which is less than 40% of the total weight of the bonnet.

Bonnet which is at once lightweight, strong and inexpensive.

6 Claims, 3 Drawing Sheets

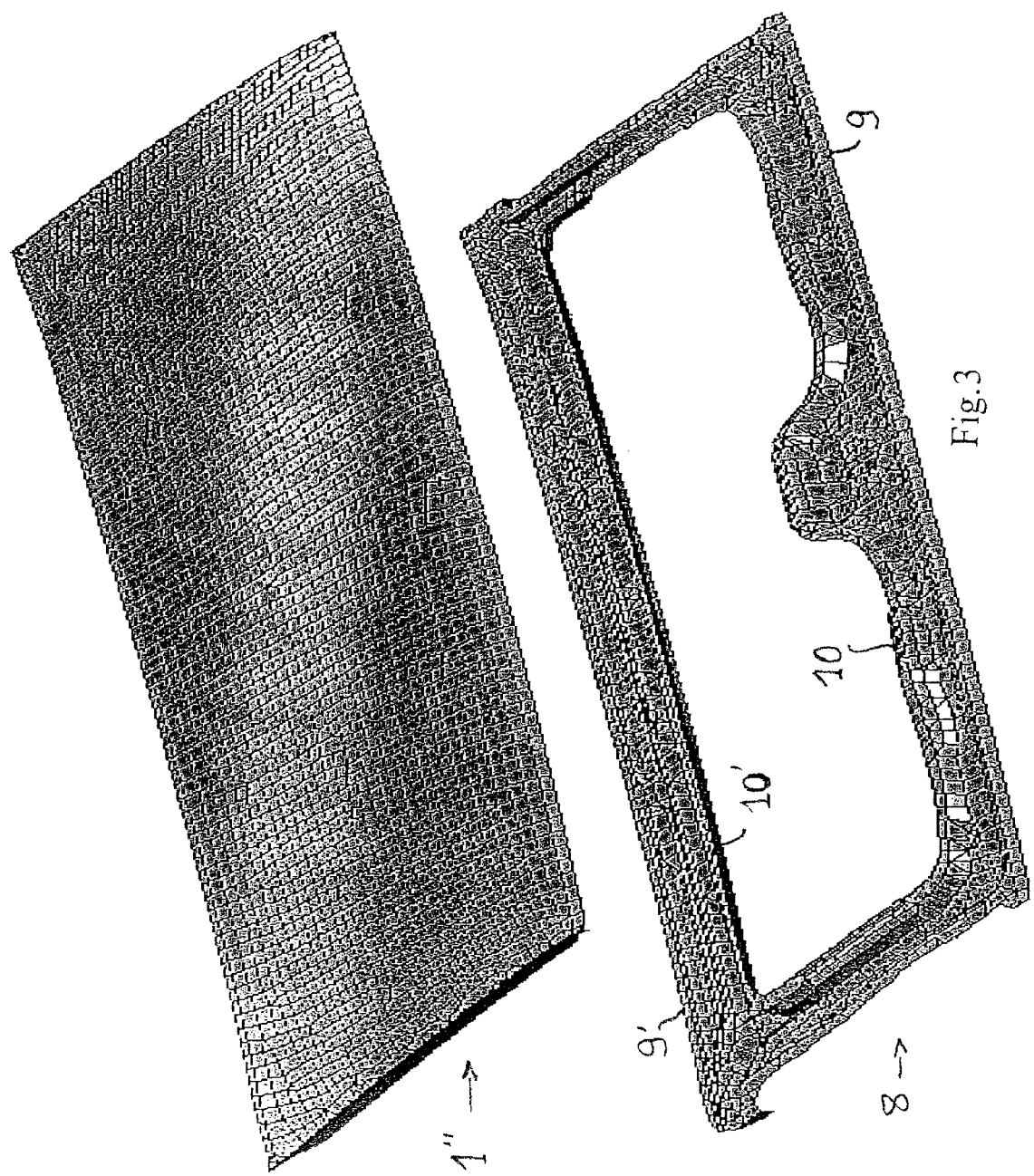

REINFORCED AND LIGHTWEIGHT MOTOR-VEHICLE BONNETT

BACKGROUND OF THE INVENTION

The invention relates to bonnets which cover a compartment at the front or at the rear of a motor vehicle; these bonnets generally cover the "engine" compartment.

Motor-vehicle bonnets generally comprise an external shell and internal means for reinforcing this shell.

As reinforcing means, it is common practice to use:
- a partial lining, as described in patent GB 2,268,130 (FORD);
- an assembly of structural members, as is described in patent U.S. Pat. No. 5,605,371 (INLAND STEEL);
- a hollow section around the perimeter of the shell, as described in patent DE 4,419,218 (OPEL).

Furthermore, motor-vehicle bonnets conventionally comprise accessories such as hinges, stops and closure means.

One of the main functions of the reinforcing means is to stiffen the bonnet, especially in torsion and in flexural; for a bonnet of rectangular general shape having four corners, the criteria adopted may then be typically as follows:

In torsion: with the bonnet held horizontally on three corners, a "standard" torsional load is exerted, by applying a vertical force having a value of 100 N to the corner not held; to meet the torsional criterion, it is necessary for the displacement of the on-held corner resulting from this "standard" torsional load to remain less than or equal to approximately 20 mm. The stiffness is expressed as the ratio of the load exerted to the resulting displacement. The torsional stiffness must then be greater than or equal to 5 N/mm;

In flexural: with the bonnet held horizontally in a stable manner on its four corners, a "standard" flexural load is exerted by applying a vertical force having a value of 110 N between any two corners of the bonnet; to meet the flexural criterion, it is necessary for the deformation resulting from this "standard" flexural load not to exceed 2 mm, which corresponds to a flexural stiffness greater than 55 N/mm.

For economic and mechanical-strength reasons, the shells and the reinforcements of bonnets are generally made of steel sheets.

For lightening purposes, it is known to make bonnets from laminated sheet comprising two facings of thin steel and a thick core based on polymer material; patent FR 2,720,802 (SOLLAC) thus describes a bonnet with a "sandwich" structure, namely a smooth upper facing, a ribbed lower facing, epoxy adhesive between the facings and in the ribs; because of the ribs of the facing, the thickness of the core is not homogeneous; because of the ribs of the sheet, it is not necessary to provide other means of reinforcing the bonnet.

In order to obtain lightweight bonnets, it is known to use aluminum sheets, but this is relatively expensive.

SUMMARY OF THE INVENTION

The object the invention is to provide a bonnet which is at once lightweight, strong and inexpensive.

For this purpose, the subject of the invention is a motor-vehicle bonnet comprising an external shell and internal reinforcing means fastened to the said shell, having a torsional strength greater than or equal to 5 N/mm and a flexural strength greater than 55 N/mm, characterized in that:
- the said shell is made of laminated composite sheet comprising two external facings made of steel sheet and a core of uniform thickness made of polymer material;
- the weight of the internal reinforcing means is less than 40%, preferably less than 20%, of the total weight of the said shell and of the said reinforcing means.

The invention also relates to one or more of the following characteristics:
- the thickness of the core is greater than or equal to 0.8 mm;
- the thickness of the facings is less than or equal to 0.25 mm;
- the said reinforcing means essentially consist of a V-shaped bracing member extending from one edge of the shell to the other; preferably, the bonnet then has hinges attached to the ends of the V and closure means attached to the base of the V of the said bracing member;
- the said reinforcing means essentially consist of two independent transverse reinforcements applied along the two opposed edges of the shell corresponding to the largest dimension of the bonnet;
- the said reinforcements and the said shell are fastened together by crimping and by adhesive bonding; preferably, the ends of the transverse reinforcements have flanged edges fastened by rivets to the corresponding flanged edges of the shell;
- the said reinforcing means essentially consist of a peripheral frame applied along the four edges of the shell; preferably, the frame and the shell are then fastened together, at least partially, by crimping, but without adhesive bonding along the inner edges of the frame.

BRIEF DESCRIPTION OF THE DRAWINGS

The invention will be more clearly understood on reading the description which follows, given by way of non-limiting example, and with reference to the appended figures, in which:

FIG. 3 illustrates a third embodiment of the invention with a conventional frame-shaped bracing member, seen in exploded perspective.

DETAILED DESCRIPTION OF THE PREFERRED EMBODIMENTS

Figure 1:
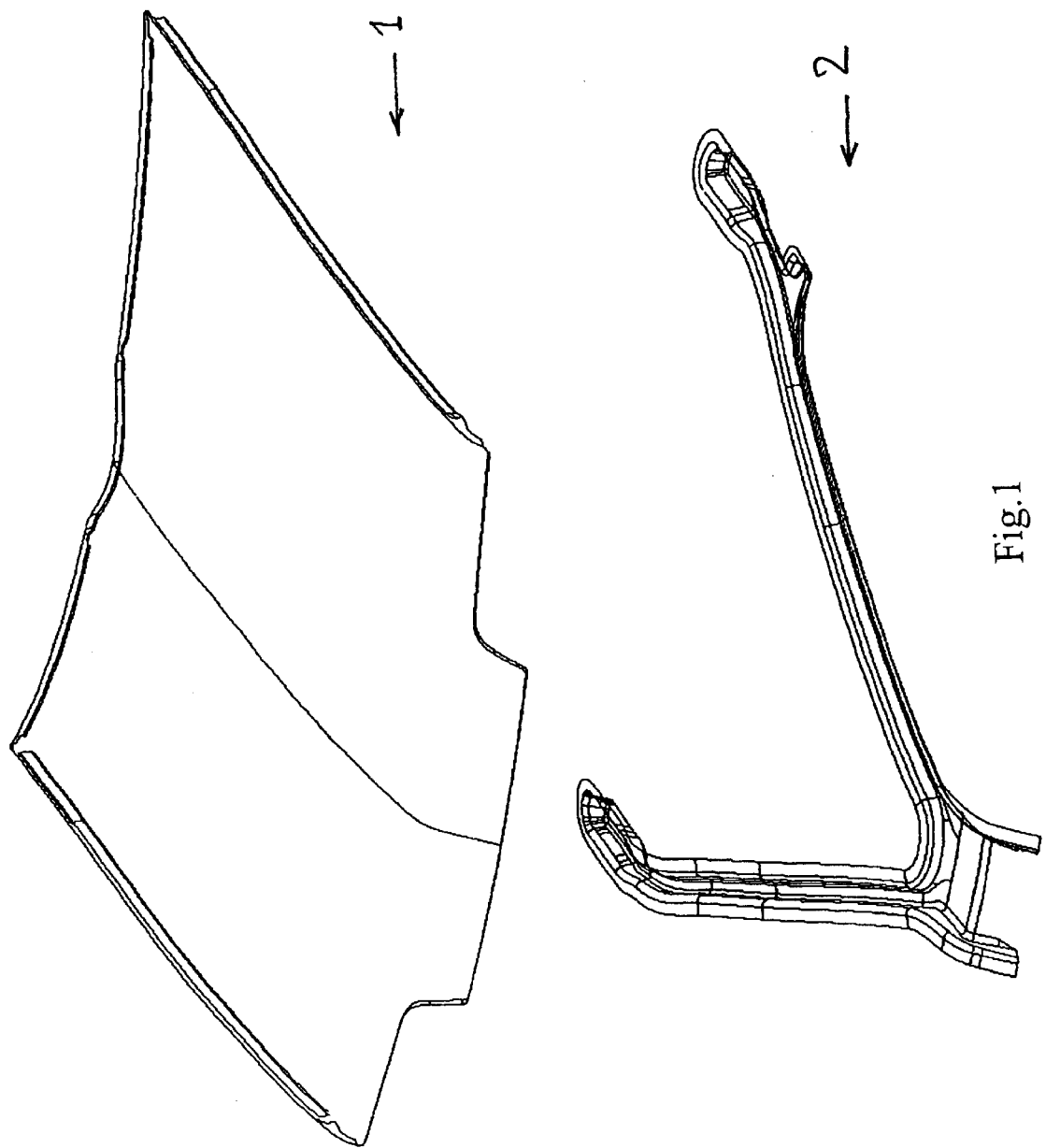
FIG. 1 illustrates a first embodiment of the invention with a V-shaped bracing member, seen in exploded perspective.

The bonnet according to the invention, and especially its external shell and its forming, its internal reinforcing means and the joining of this shell to this reinforcing means, will now be described.

According to the invention, a Laminated composite sheet is used for the shell, this sheet comprising two external facings made of steel sheet and a core of uniform thickness made of polymer material.

As polymer material, it is possible to use, for example, materials based on polypropylene or based on polyester, such as PET (polyethylene terephthalate).

The combination of high-tensile-strength facings (steel) and a core or sufficient compressive strength gives the laminated composite sheet the required mechanical strength.

In order for the core to have a sufficiently high compressive strength, it as necessary for the porosity of the polymer material to be quite low, especially less than 25% by volume; on the other hand, as indicated in document FR 2, 760,983 (SOLLAC), a minimum porosity may be necessary for facilitating the operations of forming (for example, drawing, bending, edge-flanging) and joining (for example, crimping) the laminated composite sheet, operations which are necessary or manufacturing a bonnet.

The following documents describe laminated composite sheets of this type: EP 019,835 (DOW), EP 115,103 (SUMITOMO) and 478, 039 (HOOGOVENS).

This laminated composite sheet has a very good flexural stiffness/weight ratio, especially when the thickness of the core is high and when that of the steel facings is low; table I illustrates this advantage.

TABLE I

Flexural strength of the laminated material

| Steel thickness | Core thickness | Mass (kg/m$^2$) | Flexural stiffness MPa mm$^3$ (1) | Stiffness/mass ratio |
|---|---|---|---|---|
| 0.25 mm (2) | 0.2 mm | 4.1 | 5860 | 1440 |
| 0.25 mm (2) | 0.8 mm | 4.6 | 29,500 | 6400 |
| 0.25 mm (2) | 1.5 mm | 5.2 | 81,300 | 15,500 |
| 0.7 mm (3) | 0 | 5.5 | 6003 | 1090 |

(1) calculated for flexure along a line parallel to two sides of a rectangular plate of material, per unit length of this line.
(2) thickness of a single steel facing.
(3) plane steel plate.

According to this table I, it may be seen that the laminate having a thick (1.5 mm) core weighs almost the same as the 0.7 mm steel plate but its flexural stiffness is approximately 12 times higher.

The laminates whose core has a thickness greater than or equal to 0.8 mm are therefore particularly recommended for carrying out the invention.

Thus, preferably:

the thickness of the core is greater than or equal to 0.8 mm;

the thickness of the facings is less than or equal to 0.25 mm.

The shell of the bonnet, is formed by conventional means, especially by drawing; the following documents describe the forming of laminated materials: EP 479,369 (HOOGOVENS) and EP 598,428 (HOOGOVENS).

It may happen that the thickness of the core of the laminated composite sheet varies locally in the deformation regions resulting from the forming or joining operations, as described in document R 2,760,983; despite these local thickness variations, it may be considered that the shell of the bonnet according to the invention has a core of uniform thickness.

The shell may have flanged edges which help to increase the flexural and torsional stiffness of the bonnet, especially when the height of these flanged edges is more than 15 mm; conventionally, for style and appearance reasons, the front and rear edges of the shell are generally crimped.

The shell may also be crimped around the entire perimeter.

Next, internal means for reinforcing the bonnet by means of steel sheets are prepared, using conventional means in the prior art as long as, according to the invention, the weight of these internal means remains less than 40% of the total weight of the shell and of these means.

The thickness of the steel sheet that is used to constitute these reinforcing means is generally between 0.5 and 0.9 mm; in practice, 0.5 mm is a reasonable lower limit in terms of the criteria with regard to drawability, to mechanical strength and to joining by spot welding with possible attachment reinforcements, generally made of thicker sheet; The grade of steel used for these reinforcing means is a conventional drawable graze, not having a particularly high yield stress, since the bonnet is not a structural component.

These reinforcing means are generally produced by drawing.

Using this type of sheet and this type of steel for the reinforcing means, it is necessary to choose the optimum shape which complies with the weight limit characteristic of the invention and which nevertheless makes it possible to obtain a bonnet having the required flexural and torsional strengths.

For this purpose, the conventional modelling means are used; examples 1 to 3 show very different shapes for these reinforcing means; example 3 illustrates a very conventional "frame"-type shape, while examples 1 and 2 illustrate novel shapes.

Next, the reinforcing means and the shell are joined together by conventional means, such as adhesive bonding and crimping, or else riveting.

The following examples illustrate the invention.

EXAMPLE 1

The purpose of this example is to illustrate a first embodiment of the invention in the case of a bonnet whose dimensions lie within a 1375 mm×1360 mm rectangle (1.5 m$^2$ area).

With reference to FIG. 1, the bonnet comprises a shell 1 made of laminated composite sheet and a V-shaped bracing member 2 as reinforcing means; this bonnet has no other bracing member, even along the outlines of the shell.

The V-shaped bracing member 2 extends from one edge of the shell to be reinforced to the other, in the sense that the front of the shell corresponds to the base of the V and each end of the rear edge of the shell corresponds to one end of the V.

This V-shape of the bracing member 2 is particularly advantageous when attaching the hinges and the means for closing the bonnet: this is because a hinge is attached at each end of the V along he same edge of the shell and the closure means are attached to the base of the V in the center of the opposite edge of the shell.

The bracing member 2 is made of steel sheet—0.8 mm in thickness—drawn so that its overall shape seen in section is a "U" with a maximum height of approximately 0.25 mm and an average width of 30 mm.

The laminated composite sheet used for the shell 1 comprises two facings made of steel sheet—each 0.25 mm in thickness—and a polypropylene-based core having a uniform thickness of 1.5 mm.

The edges of the shell are flanged or crimped; in the case of flanged edges, the height of the edges is greater than 15 mm, about 23 mm.

Excluding the accessories, such as hinges and closure means, the total mass of this bonnet is 9.6 kg divided between 7.9 kg in the case of the shell and only 1.8 kg in the case of the means for reinforcing the shell; She weight of the reinforcing means represents less than 20% of the weight of the bonnet excluding accessories; compared with a conventional bonnet of comparable mechanical performance (shell made of steel sheet—bracing member in the form of a lining), the weight saving is greater than 359; since the facings of the shell and the bracing member are made of steel, the bonnet remains inexpensive.

The mechanical performance obtained is then as follows:

in torsion: with the bonnet held horizontally on three corners, a "standard" torsional load is exerted by applying a vertical force having a value of 100 N to the corner not held; a displacement of this corner of approximately 20 mm as then observed; the torsional stiffness is therefore about 5 N/mm;

in flexural: with the bonnet held horizontally in a stable manner on its four corners, a "standard" flexural load is exerted by applying a vertical force having a value of 110 N between any two corners of the bonnet; whatever the flexural configuration, the observed displacement remains less Char 2 mm; the flexural stiffness is therefore greater than 55 N/mm.

EXAMPLE 2

The purpose of this example is to illustrate a second embodiment of the invention for a bonnet whose dimensions are 670 mm x 1520 mm.

Figure 2:
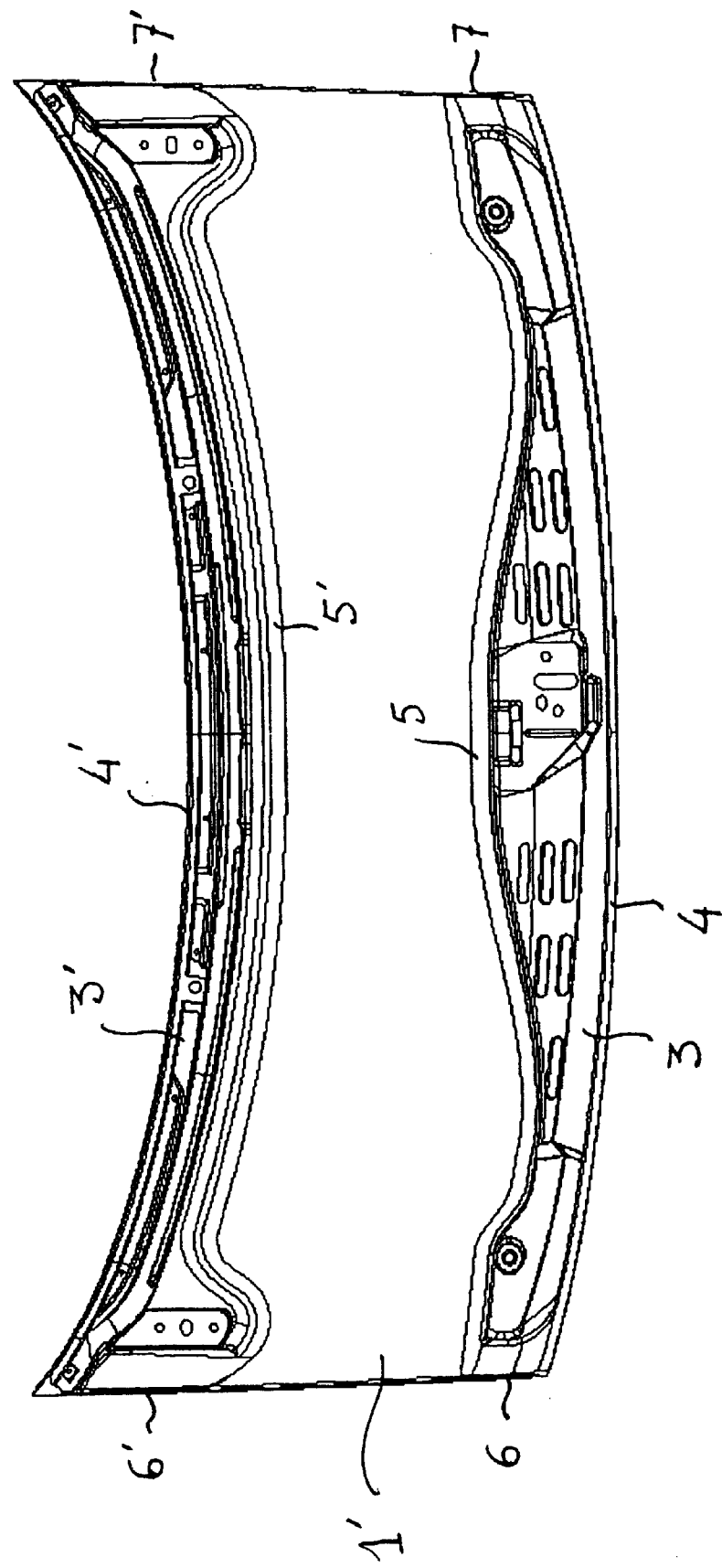
FIG. 2 illustrates a second embodiment of the invention with two independent longitudinal bracing members, seen from below.

With reference to FIG. 2, the bonnet comprises a shell 1' made of laminated composite sheet and two transverse reinforcements 3, 3' applied along two opposed edges of the shell corresponding to the largest dimension of the bonnet; this bonnet has no other bracing member.

The transverse reinforcements 3, 3' are made of steel sheet—0.6 mm in thickness—drawn to a maximum depth of 20 mm.

The laminated composite sheet used for the shell 1' comprises two facings made of steel sheet—each 0.25 mm in thickness—and a polypropylene-based core having a uniform thickness of 1 mm.

The edges of the shell are flanged or crimped; in the case of flanged edges, the height of the edges is greater than 15 mm, about 18 mm.

The bracing members and the shell are assembled as follows:

crimping of the outer edges 4, 4' of the reinforcements 3, 3' onto the front and rear edges of the shell 1', with the incorporation of a sealing mastic and adhesive;

since the inner edges 5, 5' of the reinforcements have a rabbet, application of adhesive in this rabbet in order to join it to the shell 1';

at each end 6, 7; 6', 7' of the reinforcements 3, 3', application of rivets between the flanged edge of these ends and that of the shell 1'.

The combination of these joining means advantageously improves the mechanical properties of the bonnet.

The means for closing the bonnet, as well as any stops, are attached to the front transverse reinforcement 3.

The hinge reinforcements of the bonnet are attached to the rear transverse reinforcement 3'.

Excluding accessories of the type comprising hinge reinforcements, closure means and stops, the total mass of this bonnet is 7.96 kg divided between 4.87 kg in the case of the shell and only 3.09 kg in the case of the means for reinforcing the shell; the weight of the reinforcing means represents less than 40% of the weight of the bonnet excluding accessories; compared with a conventional bonnet of comparable mechanical performance (shell made of steel sheet bracing member in the form of a lining), the weight saving is 30%; since the facings of the shell and the bracing member are made of steel, the bonnet remains inexpensive.

The mechanical performance obtained is then as follows:

in torsion: with the bonnet held horizontally on three corners, a "standard" torsional load is exerted by applying a vertical force having a value of 100 N to the corner not held; the coarser not held then undergoes a displacement of 14 mm; the torsional stiffness is therefore greater than 5 N/mm;

In flexural: with the bonnet held horizontally in a stable manner on its four corners, a "standard" flexural load is exerted by applying a vertical force having a value of 110 N between any two corners of the bonnet; whatever the flexural configuration, the observed displacement remains less than 2 mm; the flexural stiffness is therefore greater than 55 N/mm.

EXAMPLE 3

The purpose of this example is to illustrate a third, more conventional, embodiment of the invention in the case of a bonnet whose dimensions are 670 mm×1520 mm.

Referring to FIG. 3, the bonnet comprises a shell 1" made of laminated composite sheet and a frame-shaped reinforcement 8 applied around the perimeter of the shell; this bonnet has no other bracing member.

This frame is made of steel sheet, 0.6 mm in thickness, drawn to a maximum depth of 25 mm.

The laminated composite sheet used for the shell 1" comprises two facings made of steel sheet—each 0.25 mm in thickness—and a polyester-based core having a uniform thickness of 1 mm.

The edges of the shell are crimped, except the lateral edges which are flanged, the height of the flanged edges being greater than 15 mm, about 18 mm.

The bracing frame and the shell are joined together as follows:

crimping of the outer edges 9, 9' of the reinforcement 8 onto the front and rear edges of the shell 1", with the incorporation of adhesive and of sealing mastic;

since the inner edges 10, 10" of the reinforcement 8 have a rabbet, they are not adhesively bonded to the shell 1", thereby advantageously eliminating the risk of marking the shell 1" of the bonnet; to avoid any extraneous noise which would result from vibrations between these two components of the bonnet, it is hen preferable to insert a sheet of flexible material between the reinforcement and the shell; his vibration-damping sheet may be advantageously bonded to the reinforcement;

at each end of the reinforcement 8, application of rivets between the flanged edge of these ends and that of the shell 1".

The combination of these joining means advantageously improves the mechanical properties of the bonnet.

The means for closing the bonnet as well as any stops and the hinge reinforcements of the bonnet are attached to the reinforcement 8.

Excluding accessories, the total mass of this bonnet is 8.1 kg divided between 4.87 kg in the case of the shell and only 3.23 kg in the case of the means for reinforcing the shell; the weight of the reinforcing means represents less than 40% of the weight of the shell excluding accessories; compared with a conventional bonnet of comparable mechanical performance (shell made of steel sheet—bracing member in the form of a lining), the weight saving is 28%; since the facings of the shell and the bracing member are made of steel, the bonnet remains inexpensive.

The mechanical performance obtained is then as follows:

in torsion: with the bonnet held horizontally on three corners, a "standard" torsional load is exerted by applying a vertical force having a value of 100 N, to the corner not held; the corner not held then undergoes a displacement of 8 mm; the torsional stiffness is therefore greater than 5 N/mm;

in flexural: with the bonnet held horizontally in a stable manner on its four corners, a "standard" flexural load is exerted by applying a vertical force having a value of 110 N between any two corners of the bonnet; whatever the flexural configuration, the observed displacement remains less than 2 mm; the flexural stiffness is therefore greaser than 55 N/mm.

What is claimed is:

1. A motor vehicle hood comprising:

an external shell; and internal reinforcing means fastened to said shell, said hood having a torsional strength greater than or equal to 5 N/mm and a flexural strength greater than 55 N/mm;

wherein said shell is made of laminated composite sheet comprising two external facings made of steel sheet and a core of uniform thickness made of polymer material, said polymer material having a porosity of less than 25%;

wherein a weight of said internal reinforcing means is less than 40% of a total weight of said shell and said internal reinforcing means; and wherein said internal reinforcing means include a peripheral frame along all edges of said shell.

2. The hood claimed in claim 1 wherein the thickness of said core s greater than or equal to 0.8 mm.

3. The hood claimed in claim 1 wherein the thickness of said facings is less than or equal to 0.25 mm.

4. The hood claimed in claim 1 wherein the weight of said internal reinforcing means is less than 20% of the total weight of said shell and said internal reinforcing means.

5. The hood claimed in claim 1 wherein outer edges of said frame and said shell are fastened together by crimping, and without adhesive bonding inner edges of said frame to said shell.

6. The hood claimed in claim 2 wherein the thickness of said facings is less than or equal to 0.25 mm.

* * * * *